US006252488B1

(12) United States Patent
Ziegler et al.

(10) Patent No.: US 6,252,488 B1
(45) **Date of Patent: *Jun. 26, 2001**

(54) METAL OXIDE VARISTORS HAVING THERMAL PROTECTION

(75) Inventors: William R. Ziegler, East Northport; Steve Campolo, Valley Stream, both of NY (US)

(73) Assignee: Leviton Manufacturing Co., Inc., Little Neck, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 09/388,821

(22) Filed: Sep. 1, 1999

(51) Int. Cl.[7] ................................ H02H 1/00; H02H 5/04

(52) U.S. Cl. .................................. 337/5; 337/2; 337/405; 337/406; 337/6; 361/103; 361/106; 361/104; 361/124

(58) Field of Search .................................... 337/182, 114, 337/120, 403, 404, 405, 407, 2–6, 121, 123, 139, 140, 388, 401, 406; 361/117–119, 124–127, 103, 121, 56, 111, 91, 104–106, 93

(56) References Cited

U.S. PATENT DOCUMENTS

| | | | | |
|---|---|---|---|---|
| 3,638,083 | * | 1/1972 | Dornfeld et al. | 317/247 |
| 4,107,759 | * | 8/1978 | Shirn et al. | 361/275 |
| 4,107,762 | * | 8/1978 | Shirn et al. | 361/433 |
| 4,212,045 | * | 7/1980 | Martzloff | 361/127 |
| 4,224,656 | * | 9/1980 | DeMatos et al. | 361/433 |
| 4,249,224 | * | 2/1981 | Baumbach | 361/124 |
| 4,288,833 | * | 9/1981 | Howell | 361/124 |
| 4,866,560 | | 9/1989 | Allina | 361/104 |
| 4,901,187 | | 2/1990 | Allina | 361/117 |
| 4,907,119 | | 3/1990 | Allina | 361/56 |
| 5,023,747 | | 6/1991 | Lindsay | 361/117 |
| 5,315,474 | * | 5/1994 | Kuriyama | 361/534 |
| 5,363,272 | * | 11/1994 | Tanaka et al. | 361/534 |
| 5,478,965 | * | 12/1995 | Hashiba | 29/25.03 |
| 5,583,740 | * | 12/1996 | Fujino | 361/534 |
| 5,708,553 | * | 1/1998 | Hung | 361/103 |
| 5,781,394 | * | 7/1998 | Lorenz et al. | 361/124 |
| 5,901,027 | * | 5/1999 | Ziegler et al. | 361/124 |
| 5,982,597 | * | 11/1999 | Webb | 361/103 |

* cited by examiner

*Primary Examiner*—Leo P. Picard
*Assistant Examiner*—Anatoly Vortman
(74) *Attorney, Agent, or Firm*—Paul J. Sutton

(57) ABSTRACT

A layer of thermal fusible material is placed on one surface of a metal oxide varistor (MOV) to monitor the heating of the MOV due to applied voltage spikes. The thermal fusible material is part of the electrical circuit which includes the MOV and melts at a predetermined temperature. In the presence of a severe or a number of voltage spikes the MOV heats up and the heat transferred to the thermal fusible material causes it to open the electrical circuit to the MOV to prevent overheating and thermal runaway. In another form, the MOV is separated into two halves and the thermal fusible material layer is placed between the ends of the MOV halves.

4 Claims, 3 Drawing Sheets

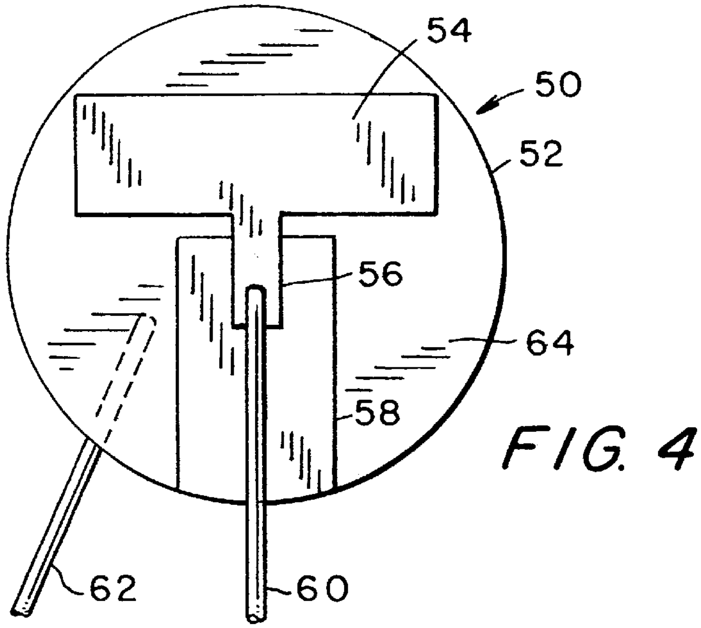
FIG. 4
FIG. 5
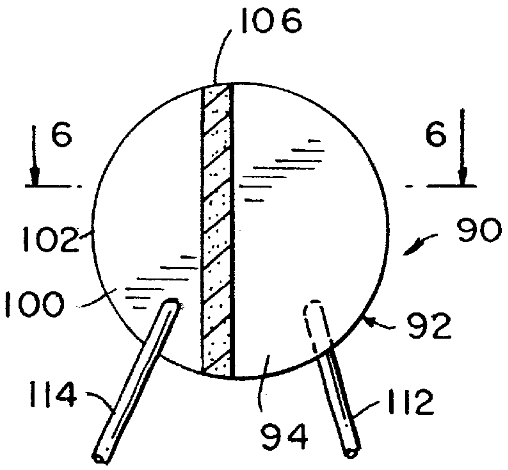
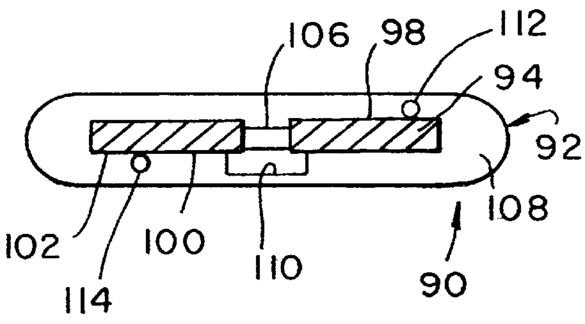
FIG. 6

METAL OXIDE VARISTORS HAVING THERMAL PROTECTION

This Application is based on U.S. patent application Ser. No. 09/074,069 filed May 6, 1998.

BACKGROUND OF THE INVENTION

1. Field of the Invention

The invention is directed to metal oxide varistors (MOVs) having thermal protection, and more particularly, to MOVs which contain fusible materials which melt before the MOVs can begin thermal runaway.

2. Description of the Prior Art

In one known prior art device, thermal cut-off fuses are mounted electrically in series with the MOVs and adjacent one face of the MOVs. When the MOV heats up, due to the flow of current through the MOV, it causes a rise in temperature at such face which melts the thermal cut-off fuse which opens the electrical circuit to the MOVs. The thermal cut-off fuse being separated from the MOV surface can be erroneously heated by other nearby components, such as resistors, or erroneously cooled by convection currents in the surrounding housing.

In a further known prior art device, thermal cut-off fuses are located remote from the surface of the MOVs they are to protect and are connected to terminals which engage one face of the MOVs. Based upon the heating the terminals sense, their associated thermal cut-off fuse may be caused to operate. The terminals must have the desired response to heat and the factors of extraneous heating and cooling are also present.

Another device provides protection by utilizing varistors having a relatively low initial conduction voltage and using more of them, in parallel and in conductive relationship with a heat sink, for dissipation of the energy load imposed by multiple lightning strikes, for example.

Still another device uses current limiting fuses between the MOVs and ground. If the current through the fuse is sufficient, the fuse blows and actuates diagnostic circuitry.

SUMMARY OF THE INVENTION

An MOV protection device according to the invention provides a fusible member in intimate contact with the MOV it is to protect and when operated by the heat produced by the MOV opens the electrical path to the MOV. In a first embodiment, a thermal fuse is formed by thermal fuse material on substantially all of one face of the MOV and a lead of the MOV is connected to such thermal fuse. When the MOV temperature reaches the operating temperature of the thermal fuse, it melts and opens the circuit to the MOV. In other embodiments only a portion of one face of an MOV is covered by thermal fuse material and this material is connected to an MOV lead. A further embodiment divides the MOV into two segments and joins them by means of a layer of thermal fuse material. When this layer melts the circuit of the MOV is interrupted.

In all cases the thermal fuse material is in intimate contact with the MOV and is able to directly operate in response to the heating of the MOV. There is little possibility that the thermal fuse material will be influenced by the heat generated by other components or the cooling effects of convection currents in any housing. It is an object of this invention to provide a novel MOV protection device.

It is another object of this invention to provide a novel MOV protection device which protects an MOV against thermal runaway.

It is another object of this invention to minimize the dangers from MOV failures.

It is still another object of this invention to provide a novel MOV protection device which is intimate contact with one face of an MOV.

It is yet another object of this invention to provide a novel MOV protection device which is wired into the circuit with an MOV and upon failure of the protection device opens the circuit of the MOV.

It is still another object of this invention to provide a novel MOV protection device which employs thermal fusible material.

It is yet another object of this invention to minimize the danger of MOV failures.

It is yet another object of this invention to reduce the fire hazard and minimize or eliminate damage to surrounding components and/or nearby personnel caused by MOV burning or explosion when overheated.

It is another object of this invention to provide a novel MOV protection device which employs a thermal fusible material in intimate contact with a MOV and which is in the conductive path to such MOV.

Other objects and features of the invention will be pointed out in the following description and claims and illustrated in the accompanying drawings, which disclose, by way of example, the principles of the invention, and the best modes which are presently contemplated for carrying them out.

BRIEF DESCRIPTION OF THE DRAWINGS

In the drawings in which similar elements are given similar reference characters:

FIG. 4 is a front elevational view of yet another MOV thermal protection device.

FIG. 5 is a front elevational view of still another MOV thermal protection device with its insulating layer removed to be able to view the components of the MOV protection device.

FIG. 6 is a top plan view of the device of FIG. 5 taken along the line 6—6.

DESCRIPTION OF THE PREFERRED EMBODIMENT

The desirability of protecting loads from short term over-voltage conditions due to lightning strikes or circuit switching or the like is well known. One class of voltage limiting protection can be provided by devices whose electrical resistance varies non-linearly under applied voltage so that conduction therethrough is slight at normal power voltages but disproportionately high at high voltages. The devices are known as varistors since the resistance can vary. Some varistors are made from sintered discs of zinc oxide or silicon oxide with other lesser materials and are identified as metal oxide varistors or MOVs. When exposed to a high voltage condition it clamps the circuit to be protected to a safe voltage and directs the remainder to ground. MOVs of the type described are available from Siemens-Part No. SIOK130, General Electric Company, McGraw-Edison and Panasonic.

If the high voltage occurrences are spaced in time the MOV will have sufficient time to cool down to its desired operating temperature. If not, the MOV will be at an elevated temperature when the next lightning strike hits and it will heat further. The hot MOV will conduct more current and the additional heating will permit more current to flow through the MOV resulting in thermal runaway and destruction of the MOV. One way suggested to protect the MOV is a thermal protection device which is wired in series with the MOV and positioned adjacent one face of the MOV. The melting point of the thermal protection device is at a temperature below what is required to put the MOV in thermal runaway. As the temperature at the face of the MOV rises, a point is reached at which the thermal protection melts and opens one lead to the MOV which no longer receives current. In all known prior art devices the thermal protection device is adjacent but spaced apart from the face of the MOV surface. It can thus be influenced by other heat sources, e.g. resistors, and cooled by any circulating air or through conduction to the surrounding air changing the time of response of the thermal protection device. This may permit the MOV to enter thermal runaway.

Figure 1:
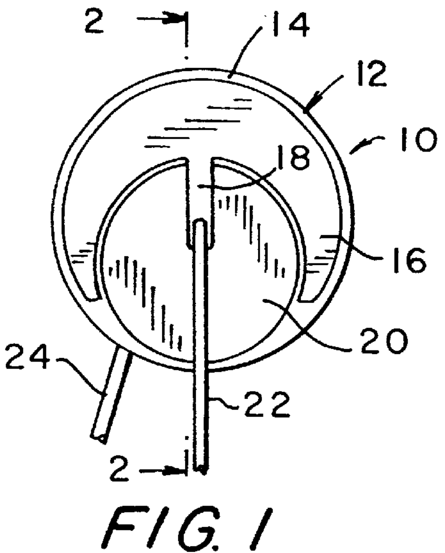
FIG. 1 is a front elevational view of a first embodiment of a MOV thermal protection device constructed in accordance with the concepts of the invention.
Figure 2:
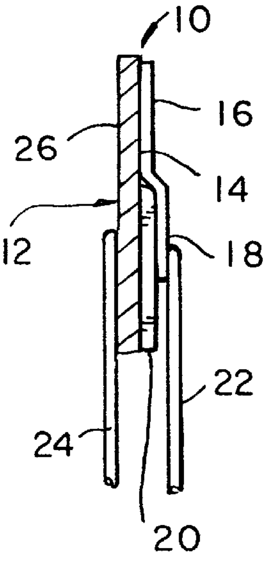
FIG. 2 is a side elevational view, partly in section, of the device of FIG. 1, taken along the line 2—2.

Turning now to FIGS. 1 and 2, a first embodiment of a thermal protection device 10 constructed in accordance with the invention is shown. On one face 14 of the MOV disc 12 is placed a layer of thermal fusible material 16. The fusible material layer 16 is thermally and electrically conductive. Thermosetting materials are preferred, such as epoxy resins readily available in granular or powder form that will become a rigid solid when heated and cured in the normal maimer. The fusible material is then attached to face 14 of MOV disc 12 by the use of adhesives, bonding or the like. As stated above, the fusible material 16 will melt at a much lower temperature than is required to cause MOV 12 failure. An insulation layer 20 covers the exposed portion of face 14. The insulation layer 20 may be constructed from non-electrically conductive material suitable for high temperature operation. The heating of the layer 20 could be caused by sustained over-voltage when the MOV is shunting current. One material which could be employed is a thin layer of ceramic. The connection tail 18 of the fusible material layer 16 extends over the top of insulation layer 20 where it can be easily connected to a first lead 22. Explosive destruction of the MOV often results in extensive damage to surrounding components and can also be a fire hazard or cause injury. A second lead 24 is connected to the other face 26 of the MOV device 12.

Thermal energy results from current flow due to a voltage surge which results in an increase in the temperature of the MOV. If the voltage surges due to lightning strikes, switching of power, etc. are well spaced the MOV can cool down between the events. However, if the events are closely spaced the MOV does not have enough time to cool down. Instead the heating of the MOV allows more current to flow which raises the temperature and this continues until the MOV is destroyed by the thermal runaway. Explosive destruction of the MOV often results in extensive damage to the surrounding components and can also be a fire hazard or cause injury. To prevent thermal runaway, the layer of thermal fusible material 16 is employed. The layer of thermal fusible material 16 is in intimate contact with face 14 of the MOV 12. It also has a connection tail 18 to which is connected a lead 22. Current is normally passed through the path of lead 24 to the face 26 of the MOV 12, the MOV 12 itself, the thermal fusible material layer 16 to the connection tail 18 and the lead 22. If the current flowing through this circuit rises due to lightning strikes, load switching, etc. resulting in the heating of the MOV then the fusible material 16 melts and opens the path to the connection tail 18 and the lead 22. This takes the MOV 12 out of the circuit, thus protecting it from excessive heating which could cause the MOV 12 to fracture and explode sending parts of the MOV 12 in all directions.

Figure 3:
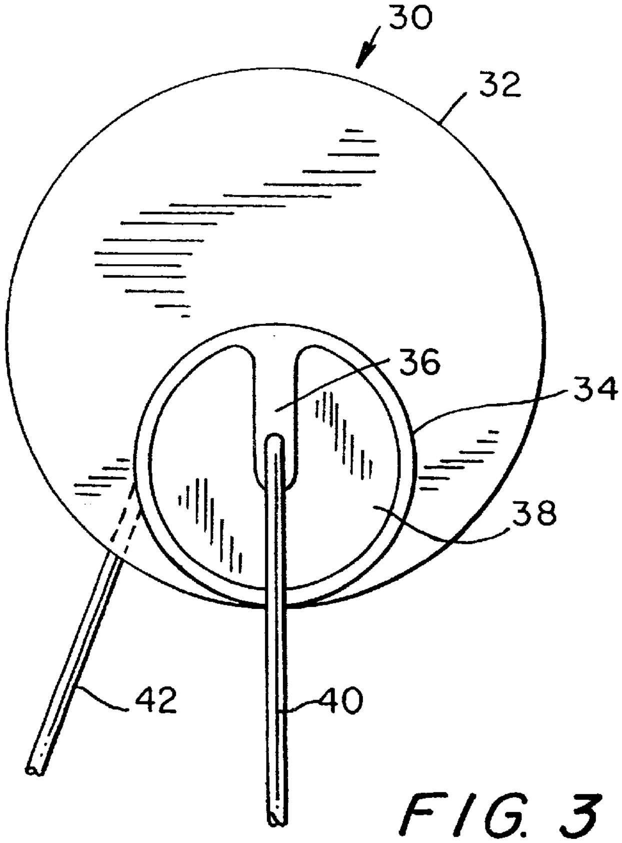
FIG. 3 is a front elevational view of another MOV thermal protection device constructed in accordance with the concepts of the invention.

The thermal fusible material layer does not have to extend over substantially all of a face of an MOV. It can extend over a lesser portion of such face as is shown in FIGS. 3, 4, 7 and 8. Referring to FIG. 3, a thermal protection device 30 is shown. The front face of MOV 32 has a generally circular layer of thermal fusible material 34 having a diameter approximately equal to the radius of the MOV 32. A connection tail 36 extends outwardly over a circular layer of insulation 38. A conductor 40 is fastened to the connection tail 36 and a second conductor 42 is fastened to the other side of the MOV 32 (not visible in the figure). The entire device is covered with a coating of epoxy or similar insulation (not shown) except for the portion of conductors 40 and 42 that extend from MOV 32. The operation of the device 30 of FIG. 3 is the same as described above with respect to device 10 in FIGS. 1 and 2.

Figure 7:
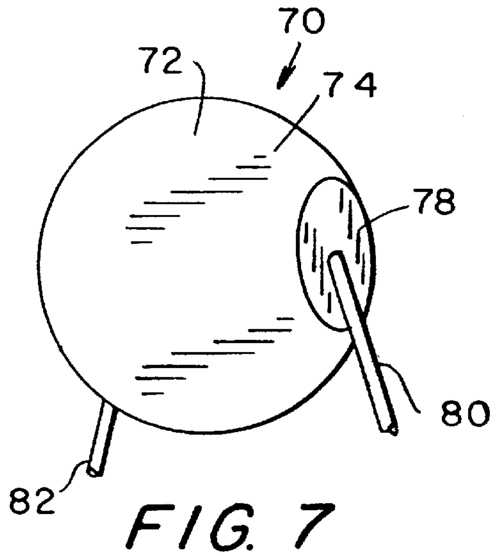
FIG. 7 is a front elevational view of a further embodiment of the MOV protection device.
Figure 8:
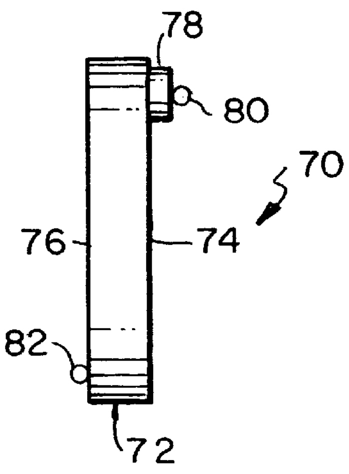
FIG. 8 is a top plan view of the device of FIG. 7.

Referring now to FIG. 4, a further thermal protection device 50 is shown. One surface of the MOV 52 has placed thereon a layer of thermal fusible material 54 in the general shape of a rectangle. A connection tail 56 extends over a thick layer of insulation 58 and is coupled to a conductor 60. A second conductor 62 is coupled to the opposite face of MOV 52 (not visible in the figure). The remainder of the face 64 of the MOV 52 is covered with a coating of Epoxy or similar material applied at the factory. A channel or space is preserved in the coating to allow room for the fusible material layer to run off during a thermal runaway condition (a non-explosive, non-short-circuited type of failure). FIGS. 7 and 8 show a thermal protection device 70 where the thermal fusible material 78 occupies only a portion of face 74 of the MOV 72. The difference in this embodiment over those of FIGS. 1 to 4 is that the conductor 80 is coupled directly to the thermal fusible material layer 78 without the use of the intermediate connection tail. Conductor 82 is coupled directly to the rear face 76 of the MOV 72 and the entire device is covered with a coating of insulation (not shown) such as epoxy or similar material except for the portion of conductors 80 and 82 that extend from MOV 72. The operation of the devices 50 and 70 are the same as that described above with respect to device 10 of FIGS. 1 and 2.

Turning now to FIGS. 5 and 6, a further form of a thermal protection device 90 is shown. The MOV 92 is made up of two halves 94 and 100 which are joined and spanned by a region of thermal fusible material 106. A conductor 112 is coupled directly to rear face 98 of half 94 and a second conductor 114 is directly coupled to front face 102 of half 100. The layer of insulation 108 (not shown in FIG. 5 to permit a better understanding of device 90) completely surrounds the device 90, except for conductors 112 and 114 which extend from the MOV 92 and gap 110 and exists adjacent the thermal fusible material 106. The gap 110 permits the run-off of fusible material layer as set forth above and any gases, produced when the thermal fusible material melts, to escape. With the thermal fusible material 106 in place a complete electrical path through the MOV 92 exists. The path goes from conductor 112 to MOV half 94, through thermal fusible material 106 to MOV half 100 and conductor 114. When the thermal fusible material band 106 melts, the path between the halves 94 and 100 is opened cutting off any current flow.

Figure 9:
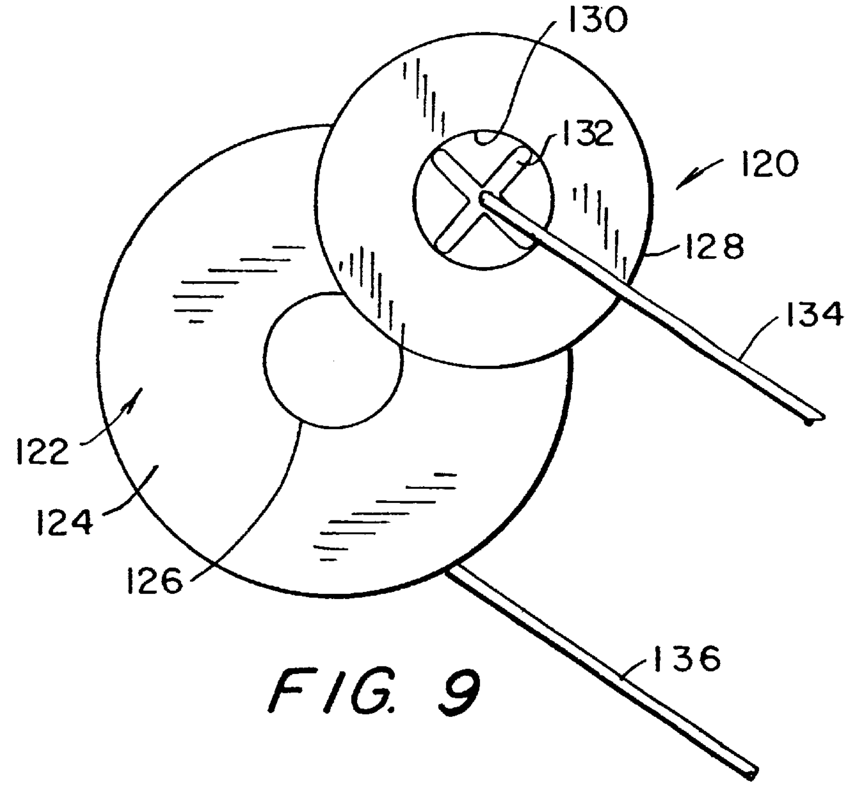
FIG. 9 is an exploded, perspective view of another embodiment of a MOV thermal protection device constructed in accordance with the concepts of the invention.

The thermal protection device 120 of FIG. 9 shows a further type of device. A MOV 122 has a disc of insulation 126 in the center of face 124. The insulation 126 is thermally conductive but non-electrically conductive. A layer of conductive material 128 with a central cutout 130 is positioned over face 124 of MOV 122, so that central cutout 130 is over insulation 126. A cruciform insert 132 is fit into the central cutout 130. The cruciform insert 132 is made of thermal fusible material and its lobes are in contact with the wall of conductive material layer 128 that defines the central cutout 130. A first conductor 134 is connected to the insert 132 and a second conductor 136 is connected to the second face of MOV 122 (not visible in the figure). A current path is established from conductor 136 through the MOV 122 to conductive layer 128 to the insert 132 and the conductor 134. The melting of the insert 132 interrupts the flow of current to conductor 134 by opening the circuit.

While there have been shown and described and pointed out the fundamental novel features of the invention as applied to the preferred embodiments, as are presently contemplated for carrying them out, it will be understood that various omissions and substitutions and changes of the form and details of the devices illustrated and in their operation may be made by those skilled in the art, without departing from the spirit of the invention.

We claim:

1. A thermal protection device for a metal oxide varistor (MOV) to prevent thermal runaway of said MOV comprising:

a) a first segment MOV element defined by a first straight side surface and a first outer side surface;

b) a second segment MOV element defined by a second straight side surface and a second outer side surface;

c) said first segment and said second segment generally describing a MOV where said first straight side surface is held parallel with said second straight side surface;

d) said first segment MOV element and said second segment MOV element heat up when exposed to voltage spikes;

e) said first segment having a first front surface and a first rear surface, said second segment having a second front surface and a second rear surface;

f) a thermal fusible material layer extending between said first segment first straight side surface and said second segment second straight side surface, said thermal fusible material layer capable of conducting current therethrough and having a predetermined temperature at which it melts and interrupts any flow of current through said thermal fusible material layer;

g) a first conductor having a first end and a second end, said first end coupled to one of said first front and first rear surfaces of said first segment, and h) a second conductor having a third end and a fourth end, said third end coupled to one of said second front and rear surfaces of said second segment, whereby current is permitted to flow through said first conductor, said first segment, said thermal fusible material layer, said second segment and said second conductor when said thermal fusible material layer is held below said predetermined temperature and current flow is interrupted when said thermal fusible material layer goes above said predetermined temperature and melts due to the heat provided by said first and second MOV.

2. A thermal protection device, as defined in claim 1, further comprising:

a) a layer of insulation surrounding said first front surface, said first outer side surface, said first rear surface, a rear surface of said thermal fusible material layer, said second rear surface, said second outer side surface, said second front surface and a front surface of said thermal fusible material layer.

3. A thermal protection device, as defined in claim 2, wherein said layer of insulation has a top surface and a bottom surface.

4. A thermal protection device, as defined in claim 3, further comprising:

a) an air gap extending from said layer of insulation top surface to said bottom surface along one side of said thermal fusible material layer.

* * * * *